Patented May 18, 1943

2,319,217

UNITED STATES PATENT OFFICE 2,319,217

AZO DYE COMPOUNDS

Joseph B. Dickey and William H. Strain, Rochester, N. Y., assignors to Eastman Kodak Company, Rochester, N. Y., a corporation of New Jersey No Drawing. Application September 25, 1940, Serial No. 358,292

4 Claims. (Cl. 260—152)

This invention relates to the art of dyeing or coloring. More particularly, it relates to new azo dye compounds and their application to the art of coloring materials, especially textile materials comprising an organic derivative of cellulose. Coloration can be effected by dyeing, printing, stenciling, or like methods.

We have discovered that the azo compounds having the given formula:

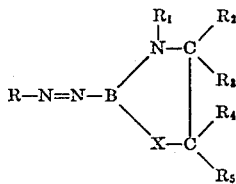

wherein R represents the residue of a member selected from the group consisting of an aryl nucleus of the benzene series and an aryl nucleus of the naphthalene series, B represents the residue of an aryl nucleus of the benzene series containing but one benzene nucleus and wherein the nitrogen atom shown and X are joined to said aryl nucleus B in para and meta position, respectively, to the azo bond, $R_1$ represents a member selected from the group consisting of hydrogen, an alkyl group, a short chain unsaturated hydrocarbon group, a furyl group, and a phenyl group, X represents a member selected from the group consisting of oxygen, sulfur, a S=O group, and a

group, $R_2$, $R_3$, $R_4$ and $R_5$ each represents a member selected from the group consisting of hydrogen, an alkyl group and a phenyl group and wherein said aryl nucleus B contains a

group in ortho or meta position to the azo bond, wherein Y represents a member selected from the group consisting of hydrogen, an alkyl group and a phenyl group constitute valuable dye compounds. Depending on their structure, the dye compounds of our invention are suitable for the coloration of organic derivatives of cellulose, wool, silk, Nylon, cotton and viscose. Compounds wherein the acylamino group is acetylamino have been found to be advantageous.

It is an object of our invention to provide a new class of azo dyes. Another object of our invention is to provide a process for the coloration of organic derivatives of cellulose. A further object is to produce colorations on textile materials which are of good fastness to light and washing. Other objects will hereinafter appear.

Typical organic derivatives of cellulose include the hydrolyzed as well as the unhydrolyzed cellulose organic acid esters such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose. While the process of our invention will be illustrated more particularly in connection with the coloration of cellulose acetate, a material which is especially adapted to be colored by the nuclear non-sulfonated dye compounds of our invention, it will be clearly understood that the dye compounds of our invention can be used to color other organic derivatives of cellulose such as those just mentioned as well as the other materials named.

The azo dye compounds of our invention can be prepared by coupling diazotized aromatic amines of the benzene or naphthalene series with a coupling component having the general formula:

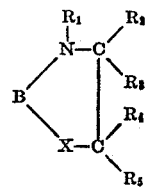

wherein B, $R_1$, $R_2$, $R_3$, $R_4$, $R_5$ and X have the meaning previously assigned to them, wherein the nitrogen atom shown and X are joined to adjacent carbon atoms of the aryl nucleus B and wherein B contains a

group, wherein Y represents a member selected from the group consisting of hydrogen, an alkyl group and a phenyl group, in a position selected from the positions numbered 5, 7 and 8 of the coupling component. No substituent should be present on the nucleus B in the position which coupling takes place.

Ordinarily the coupling component employed has the general formula:

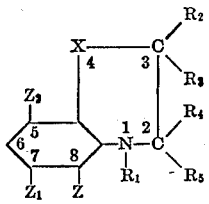

wherein $R_1$, $R_2$, $R_3$, $R_4$, $R_5$ and X have the meaning previously assigned to them, Z, $Z_1$ and $Z_2$ each represents a member selected from the group consisting of hydrogen, hydroxy and its ether and ester derivatives, an alkyl group and an amino group, and in which at least one of Z, $Z_1$ and $Z_2$ must be a

group, wherein Y represents a member selected from the group consisting of hydrogen, an alkyl group and a phenyl group.

Compounds of the general formula:

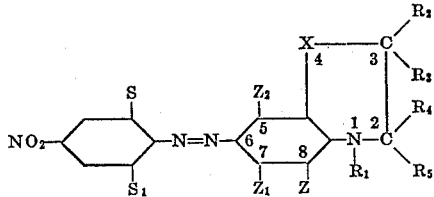

wherein $R_1$, $R_2$, $R_3$, $R_4$, $R_5$, X, Z, $Z_1$ and $Z_2$ have the meaning previously assigned to them and S and $S_1$ each represents a member selected from the group consisting of hydrogen, a halogen atom, a nitro, an alkylsulfone, a sulfonamide, a hydroxy, an alkoxy, an alkyl, a cyano, an alkylketo, and a —COO$Y_1$ group, wherein $Y_1$ represents a member selected from the group consisting of hydrogen, an alkyl group and an alkali forming metal appear to be particularly advantageous, especially for the coloration of cellulose acetate silk.

It will be understood that the term alkyl, as used herein, unless otherwise indicated, includes not only unsubstituted alkyl groups such as the methyl group, the ethyl group, a propyl group or a butyl group but also substituted alkyl groups, such as β-hydroxyethyl, β-hydroxypropyl, β,γ-dihydroxypropyl, Δ-hydroxybutyl and the ethers thereof such as β-methoxyethyl, β-ethoxyethyl, Δ-methoxybutyl and γ-methoxypropyl as well as the esters thereof such as the methyl or ethyl esters. Similarly, alkyl groups substituted by halogen or cyano, such as β-chloroethyl, γ-chloropropyl, β-iodoethyl, β-cyanoethyl and γ-cyanopropyl are included. Further, alkyl groups substituted with a sulfonic, sulfato or acid ester of phosphorus group such as β-sulfoethyl, γ-sulfopropyl, β-sulfatoethyl, γ-sulfatopropyl, Δ-sulfatobutyl, β-phosphatoethyl, β-phosphatopropyl and γ-phosphatopropyl are likewise included.

Illustrative short chain unsaturated hydrocarbon groups include —CH$_2$CH=CH$_2$, —CH$_2$CH$_2$CH=CH$_2$, —CH$_2$CH=CHCH$_3$ and —CH$_2$CH$_2$CH$_2$CH=CH$_2$, for example. Similarly, illustrative furyl groups include furfuryl, tetrahydrofurfuryl, 5-ethylfurfuryl, 5-ethyltetrahydrofurfuryl and 5-β-hydroxyethyltetrahydrofurfuryl. Further the expression "a phenyl group" includes not only the phenyl group but phenyl groups substituted, for example, with a halogen atom such as chlorine and bromine, an alkyl group, a hydroxy group, an alkoxy group, a cyano group and a nitro group.

The term "acyl" includes acyl radicals such as formyl, acetyl, butyryl, lactyl, glycyl, lauryl, benzoyl, furoyl, tetrahydrofuroyl, carbamyl,

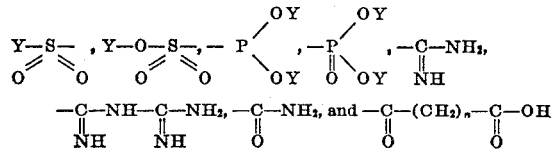

The letter Y as used above stands for an unsubstituted alkyl or phenyl group, while $n$ stands for a small whole positive number.

As previously indicated the azo dye compounds of our invention, depending on their structure, are suitable for the coloration of organic derivatives of cellulose, wool, silk, Nylon, cotton and viscose. The nuclear non-sulfonated compounds are of particular value in connection with the dyeing or coloring of organic derivatives of cellulose, although they possess some application for the coloration of cotton, wool and silk. The nuclear sulfonated compounds possess little or no practical utility for the coloration of organic derivatives of cellulose but are of utility for the coloration of silk and wool and in many cases Nylon, cotton and viscose. These sulfonated compounds may be prepared by sulfonation of the unsulfonated azo dye compounds or by prior sulfonation of the intermediates employed in their preparation. Generally speaking, when the dye compounds of our invention are to be used for the coloration of organic derivatives of cellulose, it is advantageous that they do not contain a nuclear free carboxylic acid group although this group can be present when the other materials are to be colored.

The following examples illustrate the preparation of the azo dye compounds of our invention:

*Example 1*

1 gram mole of 5-nitro-2-aminobenzenesulfonic acid is diazotized and the diazonium compound obtained is added to an ice cold hydrochloric acid solution of

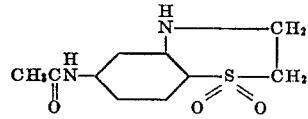

The reaction mixture is permitted to stand a short time after which the mineral acid is neutralized by the addition of sodium carbonate. The dye compound formed is salted out with sodium chloride, recovered by filtration, and dried. The dye compound obtained colors silk and wool rubine.

Example 2

1 gram mole of p-nitroaniline is diazotized and the diazonium compound obtained is coupled with 1 gram mole of

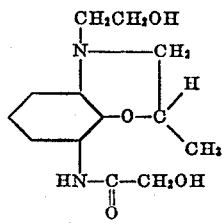

Coupling can be carried out in a cold dilute hydrochloric acid solution. The dye compound obtained colors cellulose acetate silk rubine.

Example 3

1 gram mole of 1-amino-2-chloro-4-nitrobenzene is diazotized and the diazonium compound obtained is coupled in a cold dilute hydrochloric acid medium with 1 gram mole of

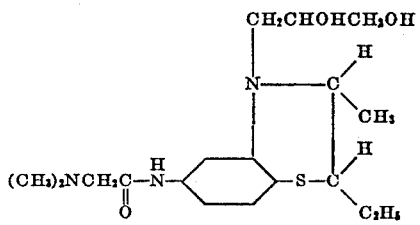

The dye compound obtained colors cellulose acetate silk violet.

Example 4

1 gram mole of 1-amino-2-fluoro-4-nitrobenzene is diazotized and the diazonium compound obtained is coupled in accordance with the general procedure described in Example 1 with 1 gram mole of

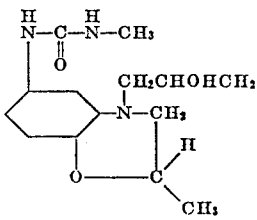

The dye compound obtained colors cellulose acetate silk violet.

Example 5

1 gram mole of 1-amino-2-hydroxy-4-nitrobenzene is diazotized and the diazonium compound obtained is coupled in accordance with the general procedure described in Example 1 with 1 gram mole of

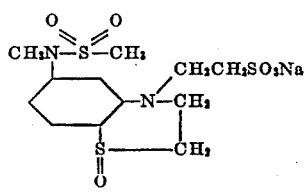

The dye compound obtained colors cellulose acetate silk, wool and silk pinkish-violet.

Example 6

1 gram mole of 2,4-dinitroaniline is diazotized and the diazonium compound obtained is coupled in accordance with the general procedure described in Example 1 with 1 gram mole of

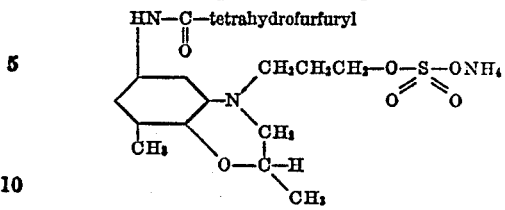

The dye compound obtained colors cellulose acetate silk, wool and silk reddish-blue.

Example 7

1 gram mole of 1-amino-2,4-dinitro-6-bromobenzene is diazotized and the diazonium compound obtained is coupled with 1 gram mole of

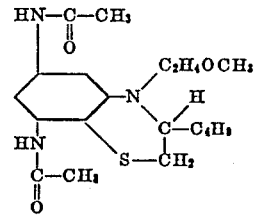

The dye compound obtained colors cellulose acetate silk blue.

Example 8

1 gram mole of 2-amino-5-nitrophenylmethylsulfone is diazotized and the diazonium compound obtained is coupled with 1 gram mole of

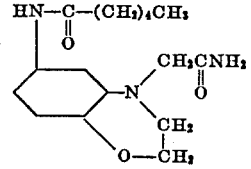

The dye compound obtained colors cellulose acetate silk bluish-purple.

Example 9

1 gram mole of 2-amino-3,5-dinitrophenylmethylsulfone is diazotized and the diazonium compound obtained is coupled in accordance with the procedure described in Example 1 with 1 gram mole of

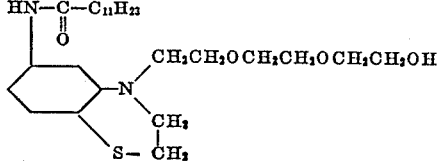

The dye compound obtained colors cellulose acetate silk blue-green.

Example 10

1 gram mole of 1-amino-2,4-dinitro-6-hydroxybenzene is diazotized and the diazonium compound obtained is coupled with 1 gram mole of

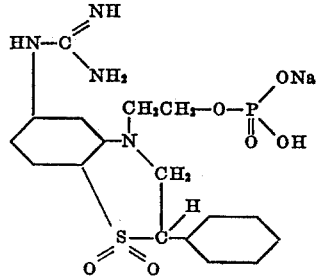

The dye compound obtained colors cellulose acetate silk, wool and silk blue.

*Example 11*

1 gram mole of 1-amino-2,4-dinitro-6-carboxybenzene is diazotized and the diazonium compound obtained is coupled with 1 gram mole of

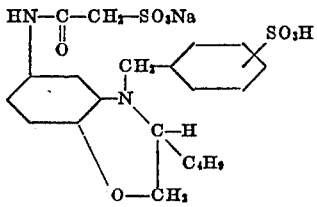

The dye compound obtained colors silk, wool, cotton, viscose and Nylon blue.

*Example 12*

1 gram mole of p-aminoazobenzene is diazotized and the diazonium compound obtained is coupled with 1 gram mole of

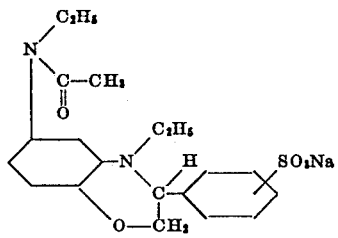

The dye compound obtained colors cotton, viscose, silk, wool and Nylon rubine.

*Example 13*

1 gram mole of 1-amino-2,4-dinitro-6-sulfonicbenzene is diazotized and the diazonium compound obtained is coupled with 1 gram mole of

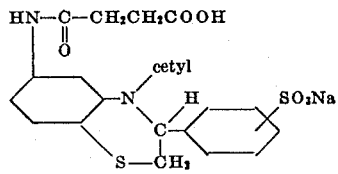

The dye compound obtained colors cotton, wool, silk, viscose, Nylon and casein wool blue.

*Example 14*

1 gram mole of 1-amino-8-naphthol-4,6-disulfonic acid is diazotized and the diazonium compound obtained is coupled with 1 gram mole of

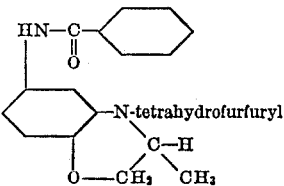

The dye compound obtained colors silk, wool, viscose, cotton and Nylon blue.

*Example 15*

1 gram mole of 1-amino-2,4-dinitro-6-sulfonethylamide benzene is diazotized and the diazonium compound obtained is coupled with 1 gram mole of 1-N-$\beta$-hydroxyethyl-3-methyl-7-acetyl-aminophenmorpholine. The dye compound obtained colors cellulose acetate silk, Nylon and silk greenish-blue.

*Example 16*

1 gram mole of 1-amino-2,4-dinitro-6-sulfonethylamide benzene is diazotized and the diazonium compound obtained is coupled with 1 gram mole of 1-N-$\beta$-hydroxyethyl-3-methyl-5-acetyl-aminophenmorpholine. The dye compound obtained colors cellulose acetate silk, Nylon and silk greenish-blue.

*Example 17*

1 gram mole of 1-amino-2,4-dinitro-6-chlorobenzene is diazotized and the diazonium compound obtained is coupled with 1 gram mole of 1-N-$\beta,\gamma$-dihydroxypropyl-3-methyl-5-acetyl-aminophen-morpholine. The dye compound obtained colors cellulose acetate silk, Nylon and silk blue.

The following tabulation further illustrates the compounds included within the scope of our invention together with the colors they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure indicated hereinbefore.

| Amine | Coupling component | Color |
|---|---|---|
| p-Aminoacetophenone | (1) [structure] | Orange. |
| Do. | (2) [structure] | Do. |

| Amine | Coupling component | Color |
|---|---|---|
| p-Aminoacetophenone | (3) ![structure] | Orange. |
| Do | (4) ![structure] | Do. |
| Do | (5) ![structure] | Do. |
| Do | (6) ![structure] | Do. |
| 1-amino-2-chloro-4-nitrobenzene | Coupling components 1-6 | Red to rubine. |
| 1-amino-2,4-dinitro-6-sulfonethyl-amide-benzene. | do | Blue. |
| 1-amino-2,4-dinitro-6-cyanobenzene | do | Do. |
| α-Naphthylamine | do | Red. |
| 1-amino-4-nitro-naphthalene | do | Violet. |
| 1-amino-2-aceto-4-nitrobenzene | do | Do. |

Coupling components employed in the preparation of the compounds of our invention can be prepared by hydrogenating a compound having the general formula:

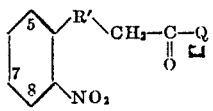

wherein R' represents oxygen or sulfur, Q represents hydrogen, alkyl or phenyl and wherein the benzene nucleus can be substituted in the positions numbered 5, 7 and 8 with a

group wherein Y represents hydrogen, alkyl or phenyl. The coupling compounds thus obtained have the general formula:

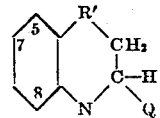

wherein R' and Q have the meaning assigned to them and wherein the benzene nucleus can be substituted in the positions numbered 5, 7 and 8 with a

group. Compounds wherein R' stands for a —S= or a

group can be prepared by appropriate oxidation with potassium permanganate or hydrogen peroxide, for example, of the coupling components wherein R' is S.

The following examples illustrate the preparation of the coupling compounds of our invention:

*Preparation of 2-methyl-7-acetaminobenzomorpholine*

One gram mole of

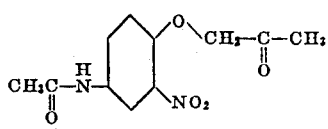

is placed in ethyl alcohol in an autoclave and hydrogenated at a temperature of 100–120° C. in the presence of Raney nickel catalyst by passing in hydrogen. When no more hydrogen is taken up, the autoclave is cooled and the reaction material removed. On distillation, a good yield of 2-methyl-7-acetaminobenzomorpholine is obtained.

In a similar manner, by the use of

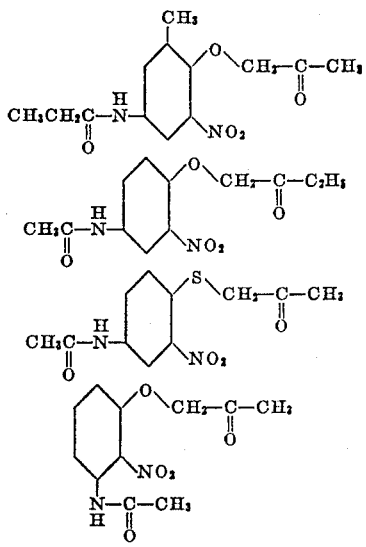

and

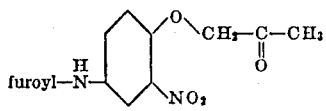

2,5-dimethyl - 7 - propionaminobenzomorpholine, 2-ethyl-7-acetaminobenzomorpholie, 2-methyl-7-acetaminobenzothiomorpholine, 2 - methyl-8-acetaminobenzomorpholine and 2-methyl-7-furoylaminobenzomorpholine, respectively, can be obtained.

*Preparation of N-β-hydroxyethyl-2-ethyl-5-methoxy-7-acetaminobenzomorpholine*

One gram mole of 2-ethyl-5-methoxy-7-acetaminobenzomorpholine is heated in an autoclave at 180° C. in dioxane with 1.1 gram moles of ethylene oxide for 8 hours. On distillation of the reaction mixture, a good yield of the desired compound is obtained.

By the use of other alkylene oxides such as propylene oxide and trimethylene oxide, other N-hydroxyalkyl compounds can be obtained. Coupling compounds wherein X is S, S=O or

instead of O can be similarly treated to introduce a hydroxyalkyl group on the nuclear nitrogen atom.

Alkyl groups can also be introduced on the nitrogen atom of the coupling components by reaction with alkylene chlorohydrins such as ethylene chlorohydrin and propylene chlorohydrin and with alkyl halides such as methyl chloride, ethyl bromide and propyl chloride. Phenyl groups can be introduced by arylation in known fashion.

Sulfonated amines which can be diazotized and the diazonium compounds obtained coupled with any of the coupling components shown herein to obtain dye compounds of our invention include, for example, p-sulfanilic acid, 1-amino-4-sulfonic naphthalene, 2-naphthylamine-8-sulfonic acid, 1-naphthylamine-3-sulfonic acid, 1-naphthylamine - 5 - sulfonic acid, 1-naphthylamine-6-sulfonic acid, 1-naphthylamine-4,8-disulfonic acid, 1-naphthylamine-3,8-disulfonic acid, 1-amino-5-naphthol-7-sulfonic acid, metanilic acid, 1-amino-2-sulfonic-4-nitrobenzene, 1-amino-2,4-disulfonic benzene and 1-amino-2-chloro-4-sulfonic benzene.

The azo dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of our invention which are water solube do not, of course, require the use of a dispersing or solubilizing agent but may be applied to silk, wool and (depending upon the nature and position of the water-solubilizing group) organic derivatives of cellulose textile materials from an aqueous solution of the dye which may contain salt. For a more complete description as to how the azo dye compounds of our invention may be employed in dyeing or coloring operations, reference may be had to our U. S. Letters Patent No. 2,115,030, issued April 26, 1938. For a more detailed description as to how the water-soluble azo dyes of our invention may be employed for the coloration of textile materials made of or containing organic derivatives of cellulose, silk and wool or mixtures of these, reference may be had to our U. S. Letters Patent No. 2,107,898, issued February 8, 1938.

We claim:

1. The azo dye compound having the formula:

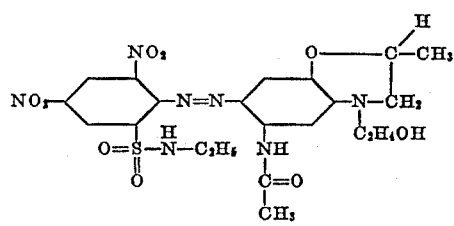

2. The azo dye compound having the formula:

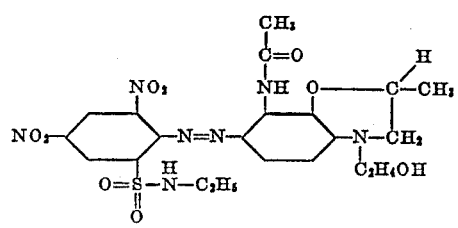

3. The azo dye compound having the formula:

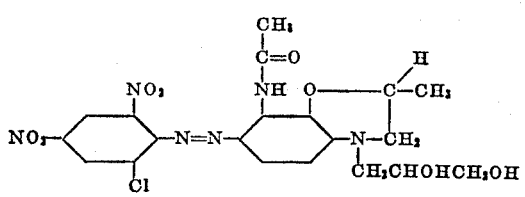

4. The azo dye compounds having the formula:

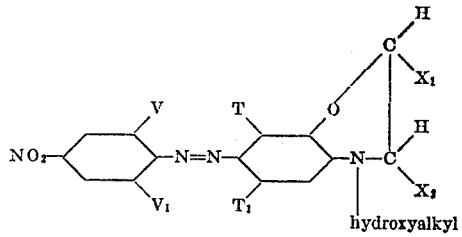

wherein V represents a member selected from the group consisting of hydrogen and a nitro group, $V_1$ represents a member selected from the group consisting of a halogen atom, a $$-SO_2\overset{H}{N}-alkyl$$

group and a $-SO_2-$alkyl group, T and $T_1$ each represents a member selected from the group consisting of hydrogen and an acylamino group and wherein at least one of the members T and $T_1$ must be an acylamino group and $X_1$ and $X_2$ each represents a member selected from the group consisting of hydrogen and methyl and wherein at least one of the members $X_1$ and $X_2$ must be methyl.

JOSEPH B. DICKEY.
WILLIAM H. STRAIN.

Certificate of Correction

Patent No. 2,319,217.  May 18, 1943.

JOSEPH B. DICKEY ET AL.

It is hereby certified that errors appear in the printed specification of the above numbered patent requiring correction as follows: Page 1, first column, line 9, for the word "given" read *general*; page 3, first column, lines 43 to 52 inclusive, Example 4, strike out the formula and insert instead the following—

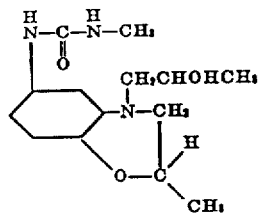

page 6, first column, line 36, for "acetaminobenzomorpholie" read *acetaminobenzomorpholine*; and second column, line 22, for "solube" read *soluble*; and that the said Letters Patent should be read with these corrections therein that the same may conform to the record of the case in the Patent Office.

Signed and sealed this 3rd day of August, A. D. 1943.

[SEAL]

HENRY VAN ARSDALE,
*Acting Commissioner of Patents.*